2 Sheets--Sheet 2.
D. L. GORMAN.
Improvement in Hydraulic-Nozzles and Turn-Pipes.
No. 130,366. Patented Aug. 13, 1872.
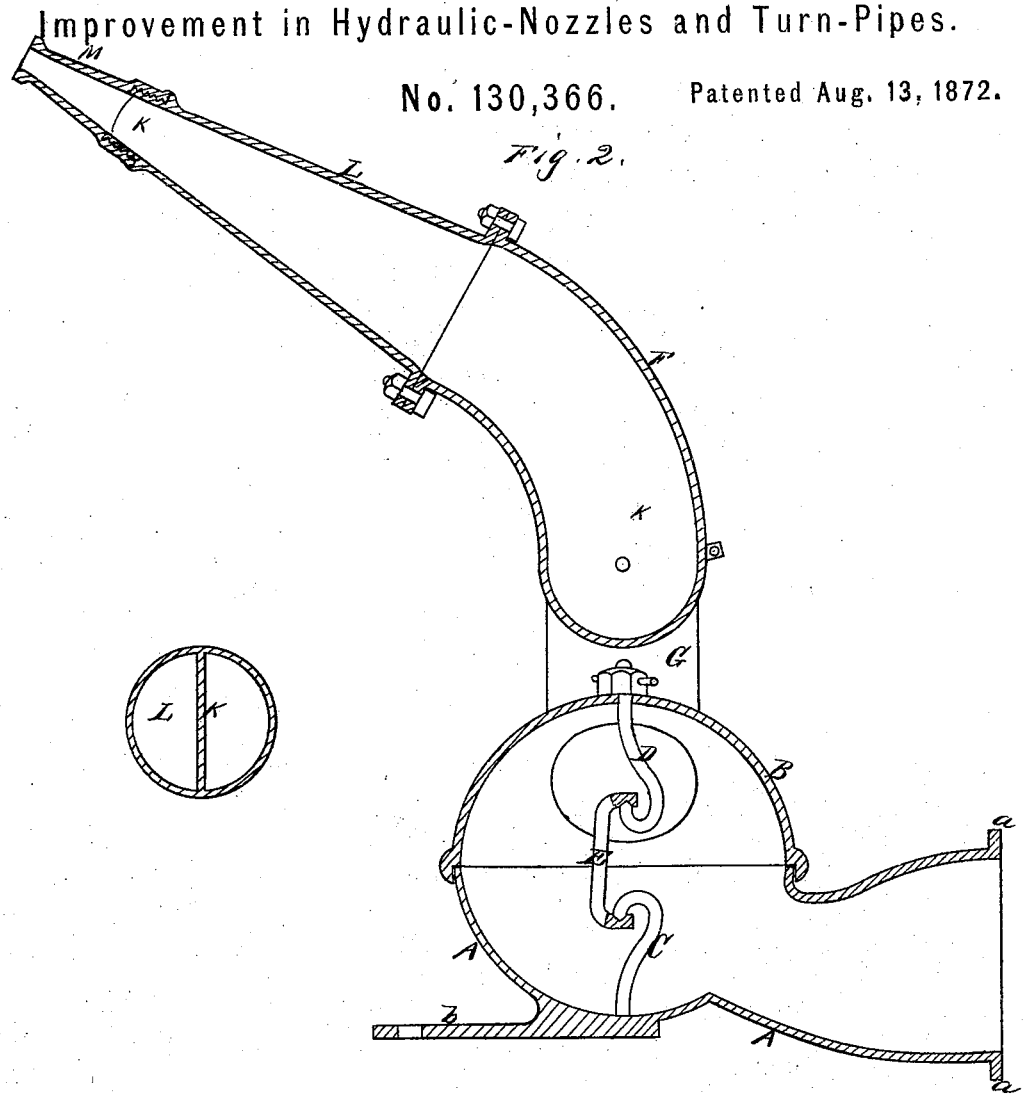
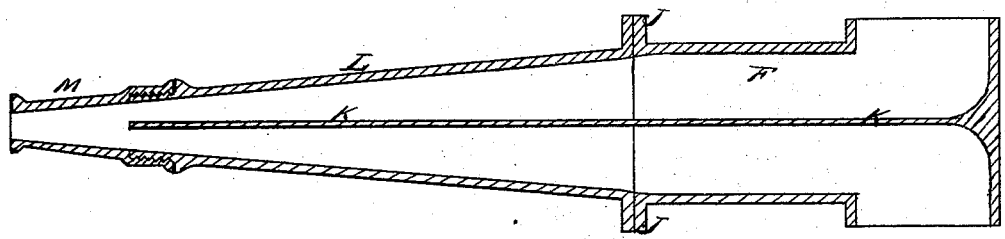
Witnesses            Inventor

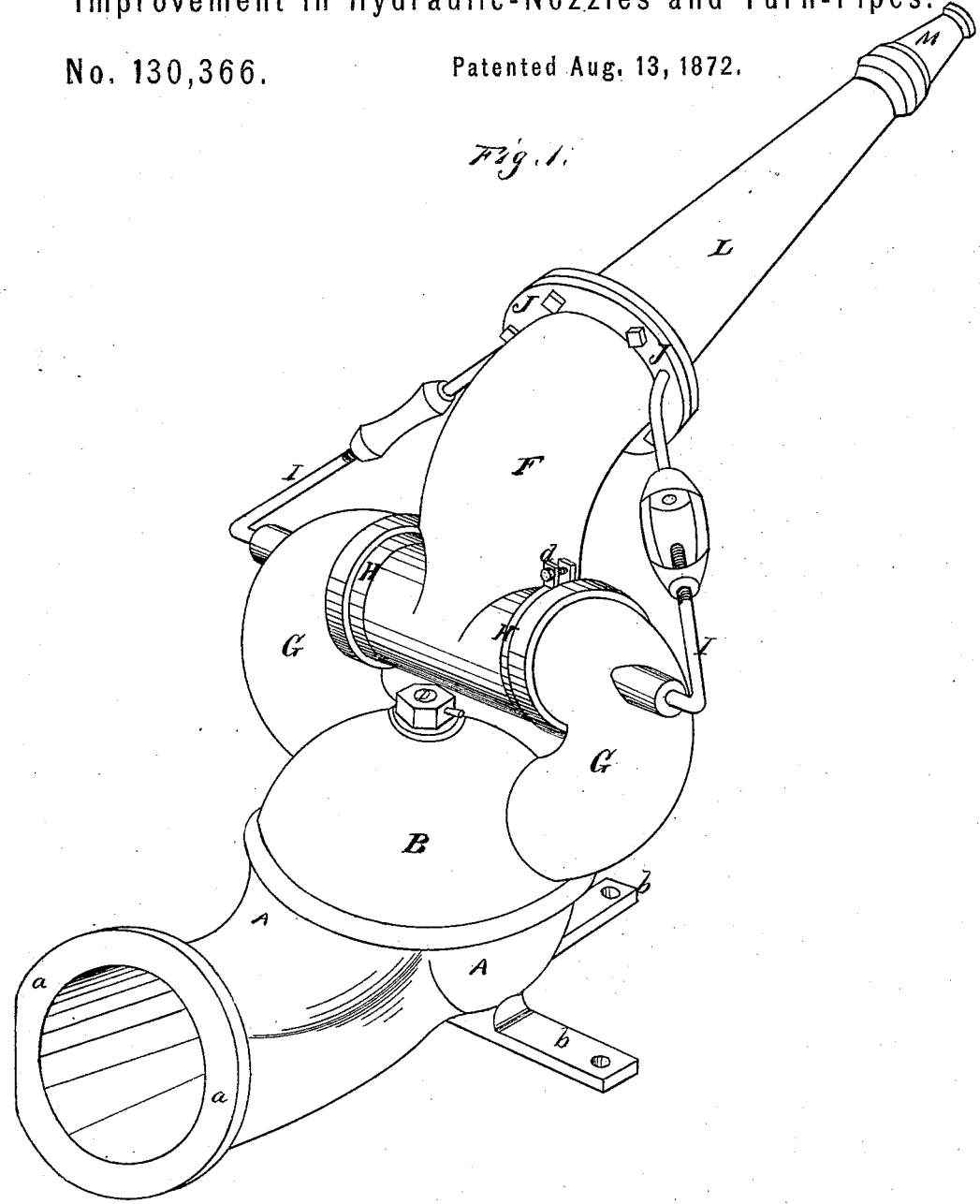

UNITED STATES PATENT OFFICE.

DENNIS L. GORMAN, OF MICHIGAN BLUFF, CALIFORNIA.

IMPROVEMENT IN HYDRAULIC NOZZLES AND TURN-PIPES.

Specification forming part of Letters Patent No. 130,366, dated August 13, 1872.

SPECIFICATION.

*To all whom it may concern:*

Be it known that I, DENNIS LEWIS GORMAN, of Michigan Bluff, in the county of Placer and State of California, have invented a new and useful Hydraulic Nozzle and Turn-pipe; and I do hereby declare that the following is a full and exact description of the same, reference being had to the accompanying drawing and to the letters of reference marked thereon.

The object of my invention is to provide an improved hydraulic nozzle and turn-pipe, by the use of which I am enabled to attain a much greater facility and range of water than can be had in the globe and other nozzles now in use; and I am also enabled to deliver a solid stream without twisting from the nozzle by bringing two separate and distinct streams together just at the point of delivery.

In order to more fully explain my invention reference is made to the accompanying drawing, in which—

Figure 1 is a perspective view; Fig. 2, a section, showing the connection for the two parts of the globe. Fig. 3 is a section of the pipe and nozzle.

A is the lower part of the two sections which form the horizontal joint, and it is extended a short distance, so as to have a flange, *a*, to which the hose or pipe is attached to bring water from the reservoir. Arms *b* may be formed on the part A, by which to secure the whole machine firmly to its place. The upper part B of the joint may be made semi-globular, or of other suitable shape, and has a flange which fits over the part A at their point of junction, and is packed, so as to make a tight joint. In order to prevent the great force of the water from separating the parts A and B I unite them by a peculiar device, shown at Fig. 2. From the bottom part A a stout rod or post, C, arises at the center, and is bent to form a curve or hook, as shown. A similar hook, D, projects downward from the center of the upper part B, and the ends of the two hooks are united by a link, E, which is bent so as to connect them and allow great freedom of motion to the horizontal joint, which can by this means be turned completely around. In order to obtain a vertical movement of the nozzle two curved pipes G are formed to lead out of the upper hemisphere B, and these pipes are so bent that their open ends stand opposite each other, as shown. Between these two ends the elbow or curve F is fitted, so as to receive the two streams of water from the two pipes, one on each side. This joint is packed with rubber or other suitable substance, and this is inclosed by straps H, which are secured and adjusted by screws *d*. To hold the pipe F in its place, and also to prevent the force of the water from separating the ends of the pipes G, so as to leak or even allow the pipe F to be forced out of its place by the pressure, I construct two rods, I, which enter the pipes G in a line with the center of motion of the vertical joint, and may be extended to the interior and secured to the central pipe F, so as to prevent any possibility of the pipes being separated. These rods are bent to a sharp angle, as shown, and are connected with the flange J by a turn-buckle or other device, so that any desired strain may be brought upon them. This effectually secures the parts, and, at the same time, allows a perfect freedom of motion and a much greater range in every direction than can be had by any globe or other form of nozzle. It also insures the full volume of water, no matter what angle the pipe may stand at, which is a great advantage over globe nozzles, as these cut off a part of the stream when turned much out of the curve on which they are constructed. Another difficulty encountered is the twisting and consequent spraying of the stream after it leaves the nozzle consequent upon the changes of direction, and this destroys the effectiveness of the stream in a great measure. This difficulty has been partially overcome by the use of radial vanes extending part way toward the center in a single pipe, but this does not wholly remedy the fault. I, therefore, separate my column of water into two streams by means of the two pipes G, before described. The curved pipe F, which receives these streams, is formed with a diaphragm or partition, K, extending vertically through its center. The direction-pipe L is, also, formed with a corresponding partition, thus maintaining the two streams entirely distinct until they reach the discharge-nozzle M, where they are united into a solid round stream, which can be thrown to a great distance without breaking. Two separate pipes might be employed in place of a divided one, but it will not be convenient, and the diaphragm-pipe is better, because the D-shape of each part prevents the twisting of either stream, and retains them in the proper shape to be united and discharged from a round nozzle without further change of form.

Having thus described my invention, I do not claim broadly the use of the two pipes G G, nor the horizontal joint between the parts A and B; but

What I do claim, and desire to secure by Letters Patent, is—

1. The combination of the sections A B, curved rods C D, and link E, as described, the rods and link serving to unite the sections and hold them together against strong pressure, and also to permit the revolution of the parts without great friction.

2. The combination of the curved pipes G G, pipes F, and stay-rods I, the rods being adapted to hold the pipes together against pressure, as described.

3. The combination of the sections A B with their rods and links, pipes G G and F, substantially as described.

In witness whereof I have hereunto set my hand.

D. L. GORMAN.

Witnesses:
 GEO. H. STRONG,
 JOHN L. SMITH.